US012386982B2

(12) United States Patent
Sanghvi

(10) Patent No.: US 12,386,982 B2
(45) Date of Patent: Aug. 12, 2025

(54) MULTI-COMPUTER SYSTEM FOR DATA PRIVACY AND GOVERNANCE

(71) Applicant: Bank of America Corporation, Charlotte, NC (US)

(72) Inventor: Siten Sanghvi, Westfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 337 days.

(21) Appl. No.: 18/070,907

(22) Filed: Nov. 29, 2022

(65) Prior Publication Data

US 2024/0176896 A1    May 30, 2024

(51) Int. Cl.
| | |
|---|---|
| *G06F 21/60* | (2013.01) |
| *G06F 21/62* | (2013.01) |
| *G06Q 20/38* | (2012.01) |
| *G06Q 20/40* | (2012.01) |

(52) U.S. Cl.
CPC .......... *G06F 21/602* (2013.01); *G06F 21/604* (2013.01); *G06F 21/6218* (2013.01); *G06Q 20/3829* (2013.01); *G06Q 20/401* (2013.01); *G06Q 20/405* (2013.01)

(58) Field of Classification Search
None
See application file for complete search history.

(56) References Cited

U.S. PATENT DOCUMENTS

| 10,924,363 B2 | 2/2021 | Pan et al. |
| 11,860,858 B1* | 1/2024 | McKervey ............ H04L 9/3297 |
| 2016/0012424 A1* | 1/2016 | Simon .................... G06Q 20/36 |
| | | 705/67 |
| 2019/0005469 A1 | 1/2019 | Dhupkar et al. |
| 2019/0228409 A1 | 7/2019 | Madisetti et al. |
| 2021/0119785 A1 | 4/2021 | Ben-Reuven et al. |
| 2023/0342340 A1* | 10/2023 | Maharaja .............. G06F 16/212 |

* cited by examiner

*Primary Examiner* — Jeffrey R Swearingen
(74) *Attorney, Agent, or Firm* — Banner & Witcoff, Ltd.

(57) ABSTRACT

Arrangements for providing data security control functions are provided. In some aspects, a request to process a transaction may be received. The transaction request may include identification of one or more destinations or target nodes for data, transaction details, a source of the transaction, and the like. In some examples, one or more data elements may be identified and a category of each data element may be identified. One or more rules engines may be identified and executed. Based on the application of rules in the one or more rules engines, secure data elements may be generated and encrypted. The encrypted data elements may be sent to a distributed ledger system for storage. One or more notifications may be transmitted to one or more target nodes indicating that data has been sent to the distributed ledger system. The target nodes may retrieve and decrypt the data to process the transaction.

20 Claims, 13 Drawing Sheets

400 Congratulations!

We are pleased to offer you the following incentive:

In exchange for sharing your wearable device data, we will give you 10% off at Coffee Shop X.

Accept

Reject

FIG. 4

MULTI-COMPUTER SYSTEM FOR DATA PRIVACY AND GOVERNANCE

BACKGROUND

Aspects of the disclosure relate to electrical computers, systems, and devices for providing customized, secure access to personal and transaction data.

Various distributed ledger systems may be publicly auditable or verifiable. Accordingly, users do not often have control over the types of data that are visible to others. Further, as transactions are processed using distributed ledgers, often parties to the transaction may receive more data than is necessary to process the transaction. Accordingly, it would be advantageous to provide customizable user data access preferences that control types of data visible and control data shared with different entities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with securely sharing data in a distributed ledger system.

In some aspects, a request to process a transaction may be received. The transaction request may include identification of one or more destinations or target nodes for data, details of the transaction, a source of the transaction, and the like. In some examples, one or more data elements may be identified and a category of each data element may be identified. In some arrangements, one or more rules engines to execute may be identified and executed. Based on the application of rules in the one or more rules engines, secure data elements may be generated and encrypted. The encrypted data elements may be sent to a distributed ledger system for storage.

In some examples, one or more notifications may be transmitted to one or more target nodes indicating that data has been sent to the distributed ledger system. The target nodes may retrieve and decrypt the data to process the transaction.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 illustrates one example user interface that may be generated in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, blockchain systems may be publicly auditable and verifiable. Accordingly, controlling data access in conventional blockchain systems can be difficult for users. Accordingly, aspects described herein enable users to customize data access preferences, anonymize or mask data, and the like, before sending the data to the distributed ledger system for storage.

For instance, a user may request a transaction. The transaction may include a plurality of data elements that may be categorized. Based on the transaction, data categories, and the like, one or more rules engines may be executed. In executing the rules engines, rules may be applied to meet regulatory requirements, comply with user data access preferences and the like. A plurality of secure data elements may be generated based on the outcome of applying the rules of the one or more rules engines.

In some examples, the secure data elements may be encrypted. The encrypted data may then be transmitted to the distributed ledger system for storage. In some arrangements, notifications may be provided to one or more target nodes that encrypted data is available for retrieval from the distributed ledger system. The one or more target nodes may then retrieve the data and process the transaction.

These and various other arrangements will be discussed more fully below.

Figure 1A:
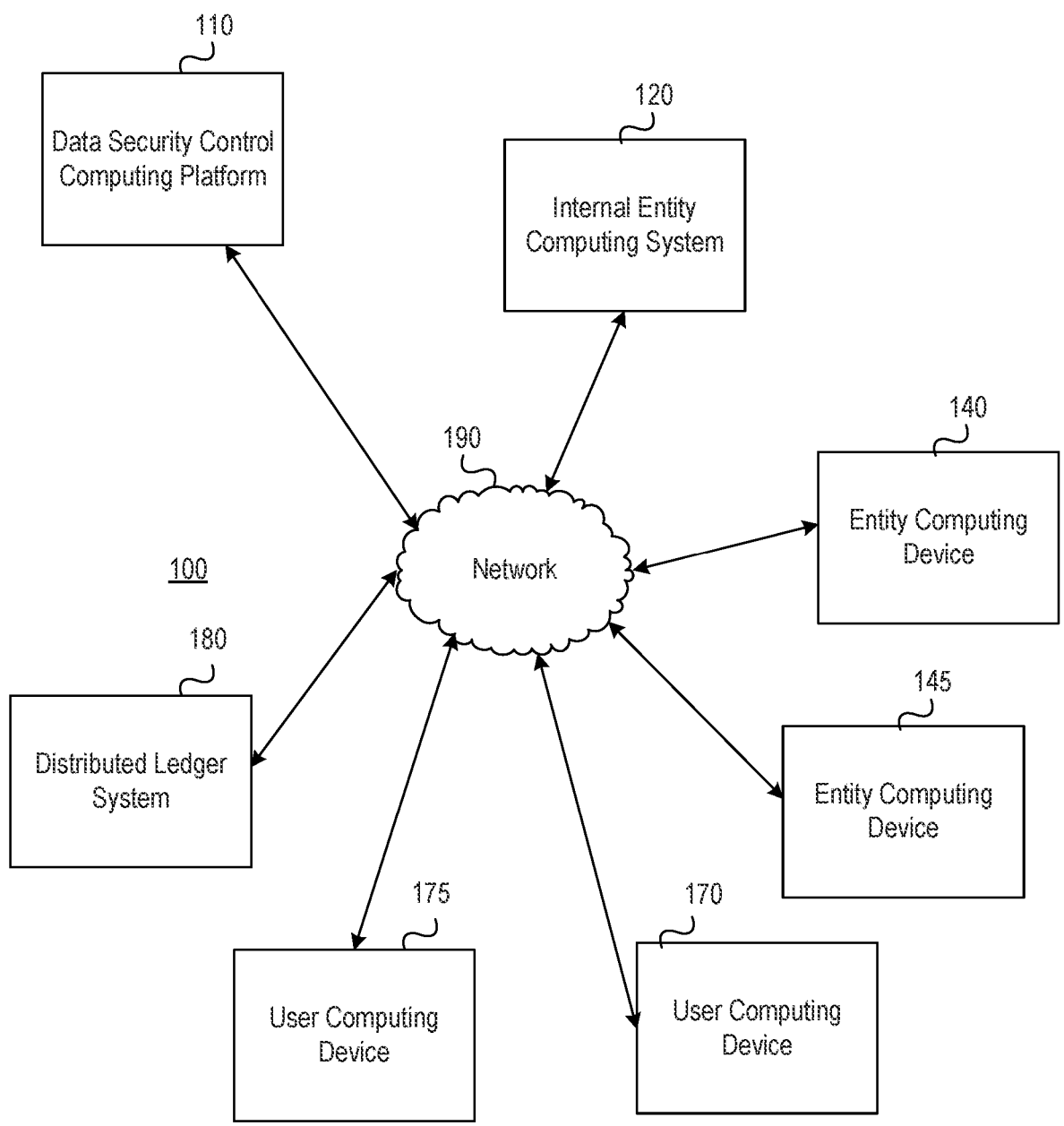
FIGS. 1A and 1B depict an illustrative computing environment for implementing data security control functions in accordance with one or more aspects described herein.
Figure 1B:
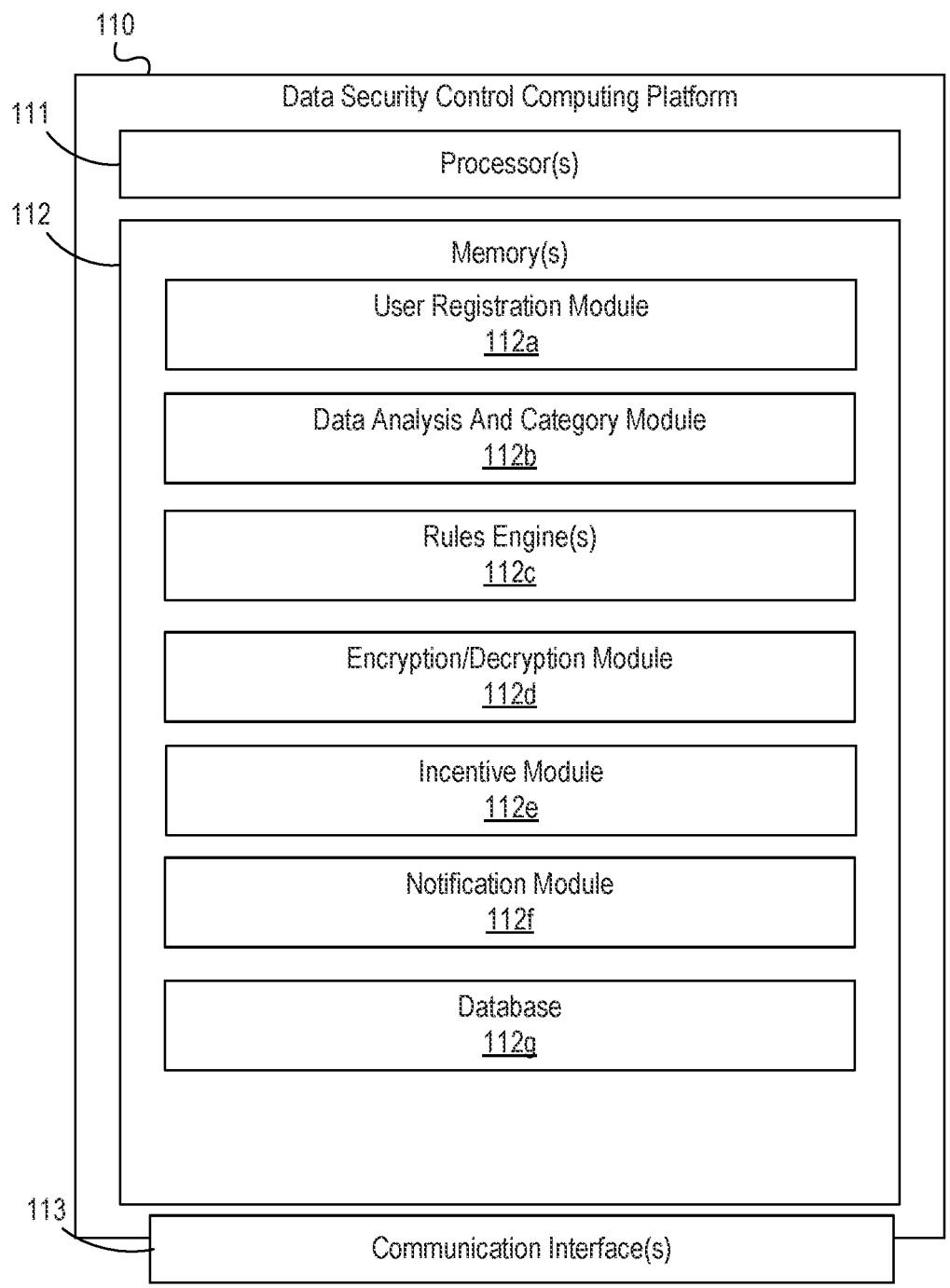

Aspects described herein may be implemented using one or more computing devices operating in a computing environment. For instance, FIGS. 1A-1B depict an illustrative computing environment for implementing data security control functions in accordance with one or more aspects described herein. Referring to FIG. 1A, computing environment 100 may include one or more computing devices and/or other computing systems. For example, computing environment 100 may include data security control computing platform 110, internal entity computing system 120, entity computing device 140, entity computing device 145, distributed ledger system 180, user computing device 170, and/or user computing device 175. Although one internal entity computing system 120, two entity computing devices 140, 145, one distributed ledger system 180, and two user computing devices 170, 175 are shown, any number of systems or devices may be used without departing from the invention.

Data security control computing platform 110 may be configured to perform intelligent, dynamic, and efficient data security control functions. In some examples, data security control computing platform 110 may sit atop a Web3 or blockchain system to control data access, implement privacy and regulatory settings, and the like. The arrangements described herein may provide an additional layer of security, governance and/or privacy control for a Web3 or blockchain system. For instance, data security control computing platform 110 may receive requests for transactions and identify, based on one or more rules engine(s) regulatory or compliance requirements, privacy requirements of a user associated with the transaction, and the like, and parse the data associated with the transaction to identify categories of data and control access to the data based on a determined category. For instance, if a user is purchasing a vehicle from another user, the transaction request may be analyzed to identify financial data associated with the transaction (e.g., amount, account number, or the like), vehicle data (e.g., make, model, and the like) and may encrypt and provide access to different users based on the identified types or categories of data.

For instance, in some examples, data may be masked and encrypted before being pushed to a distributed ledger system 180. A receiving user or user node may access the blockchain and may decrypt data associated with a category or type of data associated with the user (e.g., financial data may be accessible by a financial institution processing the request while vehicle type data may be accessible to an insurance company providing vehicle insurance).

In some examples, access to the data may be based on one or more user privacy settings. For instance, a user may share anonymized internet of things (IOT) data based on one or more privacy settings. Data from the IoT devices may be analyzed by the data security control computing platform 110 to determine a category of type and access may be provided to the data based on the identified type or category, as well as the user privacy preferences. For instance, a user may share aggregated, anonymized data related to habits of users within a household but not particular data associated with any single user within the household.

In some examples, data security control computing platform 110 may generate or identify one or more incentives or offers to present to a user in exchange for the user sharing additional data. For example, data security control computing platform 110 may generate or identify one or more offers to present to a user to encourage the user to share additional types of data, greater amounts of data, or the like. The offer may be presented to the user and the user may accept or reject the offer. The data security control computing platform 110 may then delete or implement the offer based on the user response data.

Internal entity computing system 120 may be or include one or more computing devices (e.g., servers, server blades, or the like) and/or one or more computing components (e.g., memory, processor, and the like) and may be associated with or operated by an enterprise organization implementing the data security control computing platform 110. The internal entity computing system 120 may store user account data, may process transactions, may update one or more account ledgers, may provide or update regulatory rules or requirements, and the like.

Entity computing device 140 and/or entity computing device 145 may be or include one or more computing devices (e.g., desktop computers, laptop computers, tablet devices, mobile devices, smart phones, or the like) that may be used by or associated with one or more users (e.g., employees or affiliates of) the enterprise organization. Entity computing device 140 and/or entity computing device 145 may, in some examples, be source or target nodes for transmitting and/or receiving data (e.g., sending data to a distributed ledger system 180 for distribution or access by authorized users, retrieving and decrypting data transmitted from users, and the like). In some examples, entity computing device 140 and entity computing device 145 may be associated with a same entity or different entities.

User computing device 170 and/or user computing device 175 may be or include computing devices (e.g., laptop computing devices, desktop computing devices, tablet computing devices, mobile computing devices, and the like) operated by a user external to the enterprise organization. In some examples, user computing device 170 may correspond to a user requesting a transaction, a user sharing data, or the like. User computing device 170 and/or user computing device 175 may be source or target nodes for transaction requests, data sharing, and the like. In some examples, user computing device 170 and/or user computing device 175 may be or include IoT devices that may capture and share, with permission of one or more users, data associated with one or more users.

Distributed ledger system 180 may be or include one or more computing devices or systems (e.g., servers, server blades, or the like) including one or more computer components (e.g., processors, memory, or the like) hosting a distributed ledger (e.g., blockchain, Holochain, or the like). The distributed ledger system 180 may be a public blockchain or may be a private blockchain and may, in some examples, support web3.

As mentioned above, computing environment 100 also may include one or more networks, which may interconnect one or more of data security control computing platform 110, internal entity computing system 120, entity computing device 140, entity computing device 145, distributed ledger system 180, user computing device 170 and/or user computing device 175. For example, computing environment 100 may include network 190, which may be or include a public network and/or a private network. Network 190 may include one or more sub-networks (e.g., Local Area Networks (LANs), Wide Area Networks (WANs), or the like). Network 190 may interconnect one or more computing devices. For example, network 190 may interconnect data security control computing platform 110, internal entity computing system 120, entity computing device 140, entity computing device 145, distributed ledger system 180, user computing device 170 and/or user computing device 175 to enable communication between the devices, transmission of data, and the like.

Referring to FIG. 1B, data security control computing platform 110 may include one or more processors 111, memory 112, and communication interface 113. A data bus may interconnect processor(s) 111, memory 112, and communication interface 113. Communication interface 113 may be a network interface configured to support communication between data security control computing platform 110 and one or more networks (e.g., network 190, or the like). Memory 112 may include one or more program modules having instructions that when executed by processor(s) 111 cause data security control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of data security control computing platform 110 and/or by different computing devices that may form and/or otherwise make up data security control computing platform 110.

For example, memory 112 may have, store and/or include user registration module 112a. User registration module 112a may store instructions and/or data that may cause or enable data security control computing platform 110 to receive user registration data. For instance, one or more users may register with the system and may provide user identifying information, account information, contact information, device identifying information, data privacy or access preferences, and the like. Accordingly, registered users may share data, conducts transactions, and the like, using aspects described herein and via the accounts and devices identified at registration and with privacy or access policies implemented.

Data security control computing platform 110 may further have, store and/or include data analysis and category module 112b. Data analysis and category module 112b may store instructions and/or data that may cause or enable data security control computing platform 110 to receive data, requests for transactions, and the like from a source node (e.g., user computing device 170), analyze the data to identify different types or categories of data within the transaction request or data, implement or execute one or more privacy actions (e.g., data masking, anonymizing data, and the like) and the like. For instance, data within a transaction request may be categorized to identify any user privacy rules to implement, regulatory requirements to execute, and the like. Privacy actions may be executed and one or more rules engines may be identified and executed to determine regulatory requirements that may apply.

Data security control computing platform 110 may further have, store and/or include one or more rules engines 112c. Rules engine 112c may store instructions and/or data that may cause or enable data security control computing platform 110 to execute one or more rules to determine data accessibility. For instance, rules engine 112c may include rules associated with regulatory requirements for a plurality of countries, regions, industries, or the like. Accordingly, based on the type of data identified in a receipt of data or request for transaction, rules from one or more rules engines 112c may be applied or executed to identify data accessibility, privacy requirements, and the like. Accordingly, data may be parsed into a plurality of pieces that may be handled differently based on the type of data (e.g., a transaction initiated at a source in a first country and completed at a target node in a second country may require implementation of regulatory rules in both countries for some or all of the data associated with the transaction).

Data security control computing platform 110 may further have, store and/or include encryption/decryption module 112d. Encryption/decryption module 112d may store instructions and/or data that may cause or enable data security control computing platform 110 to encrypt transaction data, data being shared, or the like, or portions of the data, and push the encrypted data to the distributed ledger system 180. In some examples, the encrypted data may be decrypted by a designated target node. In some arrangements, for a single transaction request, a plurality of different data elements may be encrypted individually (e.g., based on type), transmitted to the distributed ledger system 180, retrieved from the distributed ledger system 180 by a respective target or recipient for each data element of the plurality of data elements and decrypted by the respective target node or recipient.

Data security control computing platform 110 may further have, store and/or include incentive module 112e. Incentive module 112e may store instructions and/or data that may cause or enable the data security control computing platform 110 to generate one or more incentives for a user to share or otherwise modify privacy or data access preferences. For instance, incentive module 112e may generate one or more rewards, discounts, or other incentives to provide to a user to encourage the user to share additional data, additional types of data, or otherwise modify privacy parameters. The rewards or incentives may include a token that may be exchanged at one or more vendors or service providers for goods or services.

Data security control computing platform 110 may further have, store, and/or include notification module 112f. Notification module 112f may store instructions and/or data that may cause or enable the data security control computing platform 110 to generate one or more notifications related to requests for transactions, data sharing, and the like, and transmit the one or more notifications to one or more devices (e.g., target node, source node, or the like). In some examples, transmitting the notification may cause the notification to be displayed on a display of the computing device.

Data security control computing platform 110 may further have, store and/or include database 112g. Database 112g may store user registration data, historical transaction request data, regulatory requirements and updates, and the like.

FIGS. 2A-2H depict one example illustrative event sequence for implementing data security control functions in accordance with one or more aspects described herein. The events shown in the illustrative event sequence are merely one example sequence and additional events may be added, or events may be omitted, without departing from the invention. Further, one or more processes discussed with respect to FIGS. 2A-2H may be performed in real-time or near real-time.

Figure 2A:
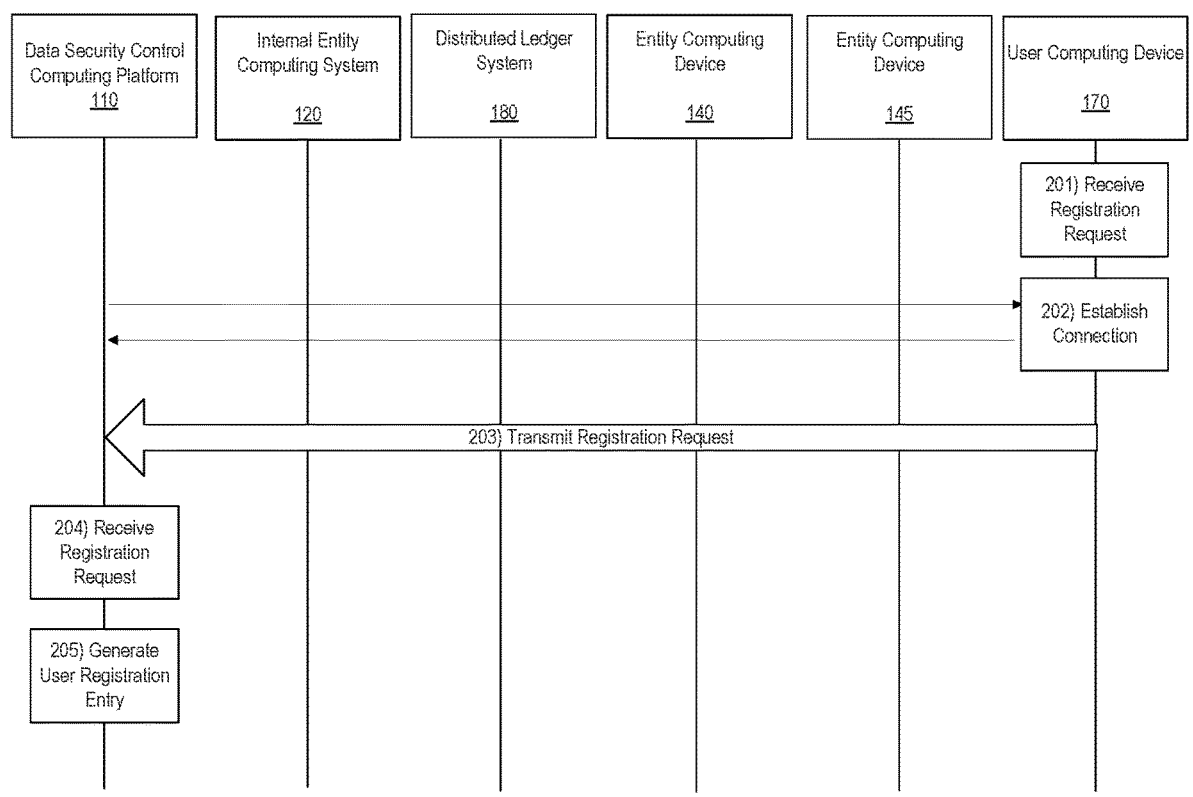
FIGS. 2A-2H depict an illustrative event sequence for implementing data security control functions in accordance with one or more aspects described herein.

With reference to FIG. 2A, at step 201, a registration request may be received by, for instance, user computing device 170. For instance, user input may be received requesting registration with the data security control system. The registration request may include user identifying information, user device identifying information, user account information, user privacy or data access preferences, and the like. In some examples, the user privacy or data access preferences may include an amount or type of data that may be shared by a particular device or type of device (e.g., automated personal assistant, wearable device, smart phone, or the like).

At step 202, user computing device 170 may connect to data security control computing platform 110. For instance, a first wireless connection may be established between user computing device 170 and data security control computing platform 110. Upon establishing the first wireless connection, a communication session may be initiated between user computing device 170 and data security control computing platform 110.

At step 203, user computing device 170 may transmit or send the registration request and associated registration data to the data security control computing platform 110. For instance, the user computing device 170 may transmit or send the registration request and/or registration data during the communication session initiated upon establishing the first wireless connection.

At step 204, data security control computing platform 110 may receive the registration request. At step 205, data security control computing platform 110 may generate a registration entry. For instance, data security control computing platform 110 may modify a database (e.g., database 112g) or otherwise store the registration data for the requesting user. In some examples, user privacy and data access preferences may be stored and, in some examples, added to one or more rules engines to execute upon receiving transaction or other requests from the user.

Figure 2B:
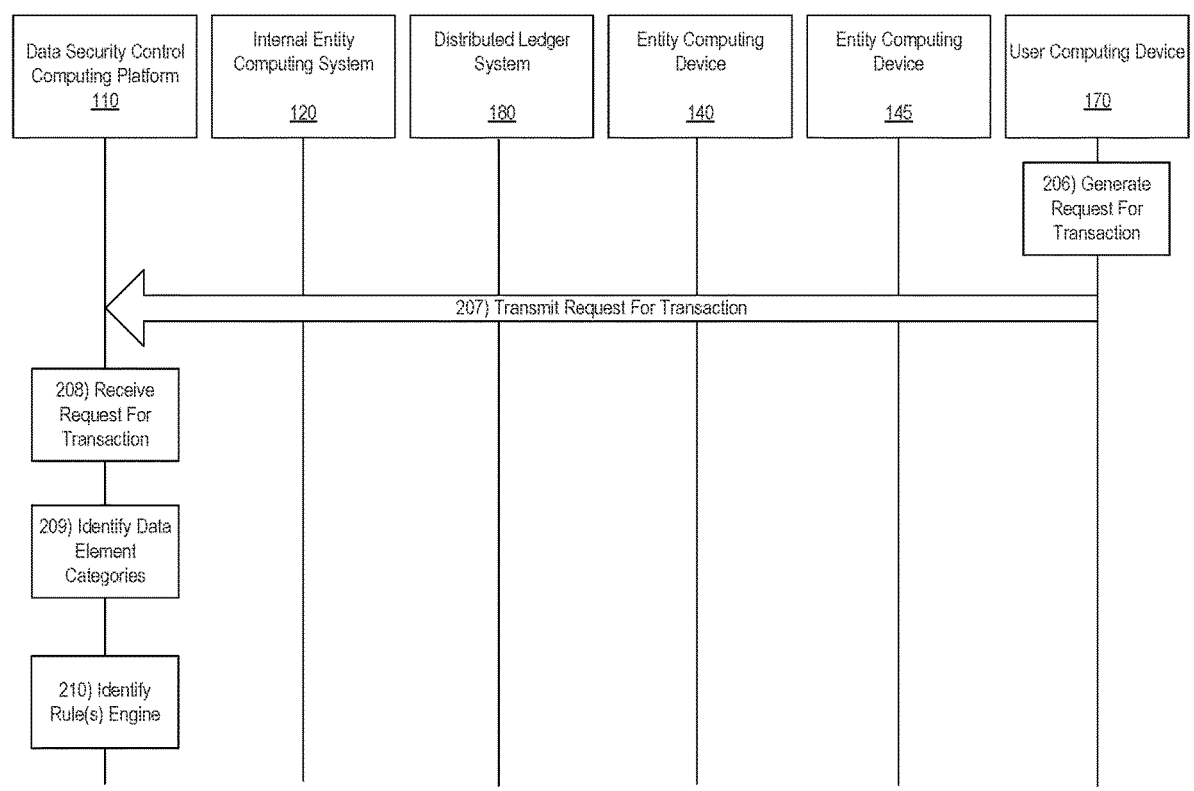

With reference to FIG. 2B, at step 206, user computing device 170 may receive a request for a transaction. For instance, user computing device 170 may request to purchase goods or services from another user, pay an invoice associated with goods or services received, or the like. In some examples, the request for transaction may include data sharing from one or more user computing devices (e.g., location data, movement data, data captured by a fitness tracker, or the like) in accordance with one or more user privacy or data access preferences provided at registration.

At step 207, user computing device 170 may transmit or send the request for transaction to the data security control computing platform 110. For instance, user computing device 170 may transmit or send the request for transaction during the communication session initiated upon establishing the first wireless connection. Alternatively, a new connection and communication session may be established.

At step 208, data security control computing platform 110 may receive the request for transaction and process the request.

At step 209, data security control computing platform 110 may parse the data within the request for transaction to identify one or more data elements and a data category of each data element. For instance, if the request for transaction is a request to purchase a vehicle, data related to an amount of the purchase, buyer device information (e.g., a source node) a seller of the vehicle (e.g., user device information of the seller target node), other target node data (e.g., a financial institution to or from which funds may be transferred), account information of the seller and buyer, a make of the vehicle, a model of the vehicle, a year of the vehicle, and the like, may be identified as discrete data elements. Data security control computing platform 110 may identify a category for each data element. For instance, the amount of the purchase and account details, may be identified as a "payment" category, details of the purchase may be identified as a "product detail" category, source and target node data may be identified as "node" category, and a name of the buyer and seller may be identified as "personal" category.

At step 210, one or more rules engines to execute with respect to one or more data elements may be identified. For instance, based on the identified data categories, and data associated with the transaction, one or more rules engines may be identified to analyze the data and apply one or more rules. For instance, if a source node is identified in a first location and the target node is in a second location, one or more rules engines for transactions between those locations may be identified. In some examples, the rules engine(s) identified may apply regulatory requirements. Further, one or more rules engine(s) may apply user privacy and data access preferences.

Figure 2C:
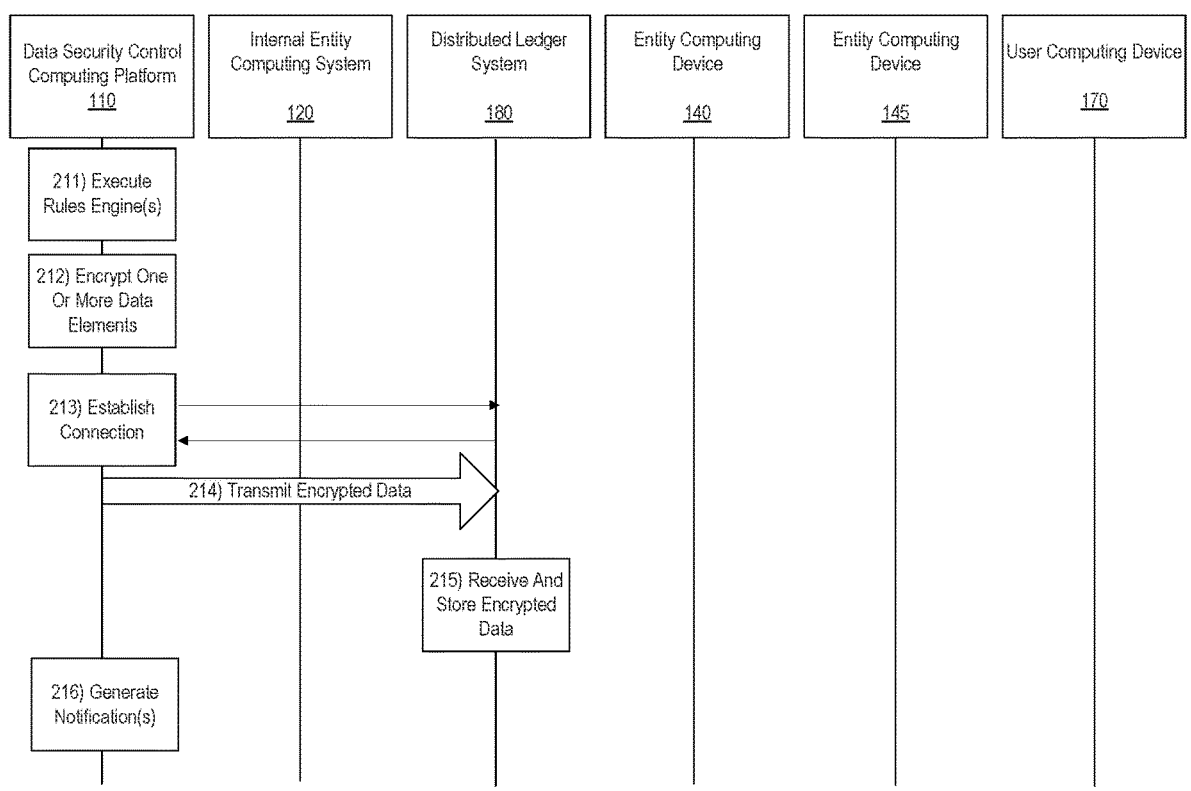

With reference to FIG. 2C, at step 211, the data security control computing platform 110 may execute the one or more rules engine(s) on particular data elements. For instance, a rules engine related to regulatory reporting requirements for purchases in the purchase location or sale location may be identified and executed. In another example, a rules engine related to privacy or data access preferences of the user requesting the transaction may be executed. In executing the one or more rules engine(s), the rules appropriate to each data element or data category may be applied. Data elements may be flagged, or otherwise modified based on execution of the rules engine(s).

At step 212, data security control computing platform 110 may encrypt the one or more data elements. In some examples, the encrypted data may only be decrypted by a target node associated with the transaction or particular data type of the transaction. In some different data elements may be decrypted by different target nodes.

At step 213, data security control computing platform 110 may connect to distributed ledger system 180. For instance, a second wireless connection may be established between data security control computing platform 110 and distributed ledger system 180. Upon establishing the second wireless connection, a communication session may be initiated between data security control computing platform 110 and distributed ledger system 180.

At step 214, the data security control computing platform 110 may push the encrypted data elements to the distributed ledger system 180. In some examples, the encrypted data elements may be transmitted or sent to the distributed ledger system 180 during the communication session initiated upon establishing the second wireless connection.

At step 215, distributed ledger system 180 may receive the encrypted data and store the encrypted data elements in a distributed ledger (e.g., blockchain, Holochain, or the like). For instance, the distributed ledger system 180 may store the encrypted data elements by modifying the distributed ledger to add blocks associated with the data elements.

At step 216, data security control computing platform 110 may generate one or more notifications. For instance, data security control computing platform 110 may generate one or more notifications indicating that encrypted data may be available for retrieval from the distributed ledger system 180, that user data has been stored on the distributed ledger, and the like. In some examples, the generated notification(s) may include a key to decrypt the data by the target node.

Figure 2D:
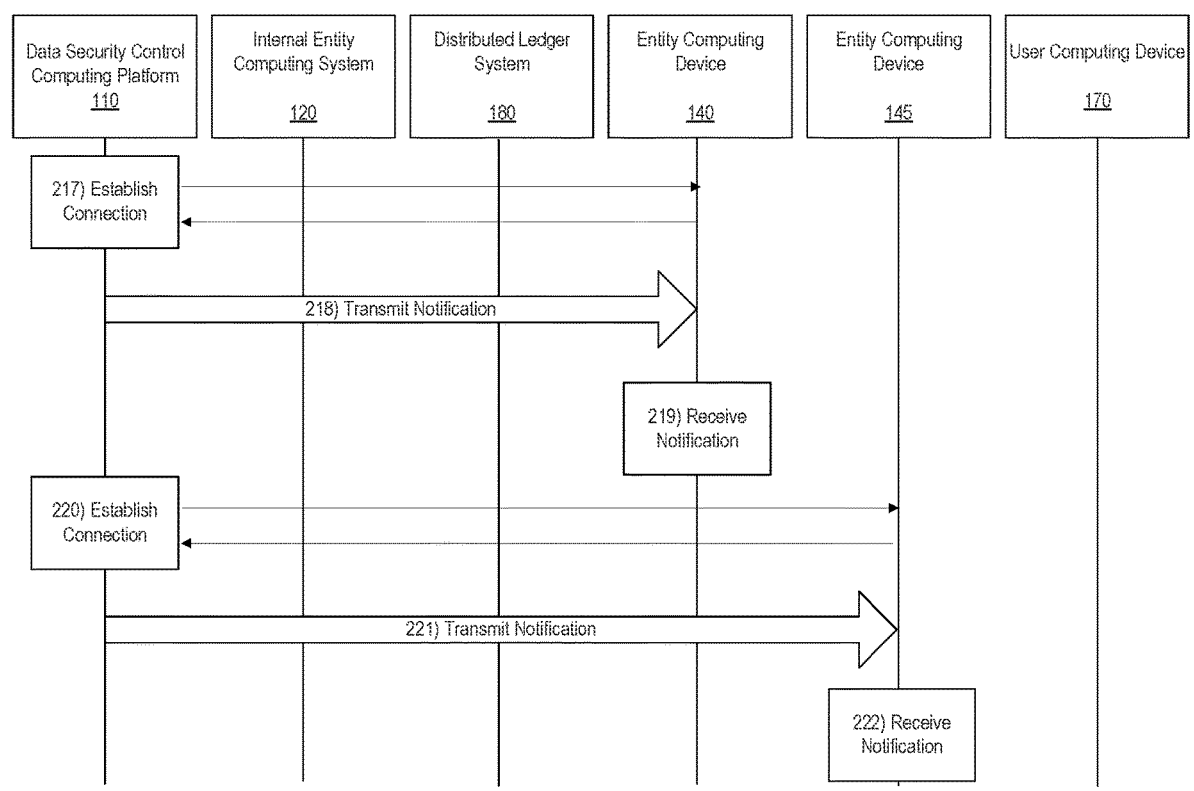

With reference to FIG. 2D, at step 217, data security control computing platform 110 may connect to entity computing device 140. For instance, a third wireless connection may be established between data security control computing platform 110 and entity computing device 140. Upon establishing the third wireless connection, a communication session may be initiated between data security control computing platform 110 and entity computing device 140.

At step 218, data security control computing platform 110 may transmit or send a generated notification to the entity computing device 140. For instance, data security control computing platform 110 may transmit or send the generated notification during the communication session initiated upon establishing the third wireless connection. In some examples, transmitting or sending the notification may cause the notification to be displayed by a display of the entity computing device 140.

At step 219, entity computing device may receive the notification and display the notification.

At step 220, data security control computing platform 110 may connect to entity computing device 145. For instance, a fourth wireless connection may be established between data security control computing platform 110 and entity computing device 145. Upon establishing the fourth wireless connection, a communication session may be initiated between data security control computing platform 110 and entity computing device 145.

At step 221, data security control computing platform 110 may transmit or send a generated notification to the entity computing device 145. For instance, data security control computing platform 110 may transmit or send the generated notification during the communication session initiated upon establishing the fourth wireless connection. In some examples, transmitting or sending the notification may cause the notification to be displayed by a display of the entity computing device 145.

At step 222, entity computing device 145 may receive the notification and display the notification.

Figure 2E:
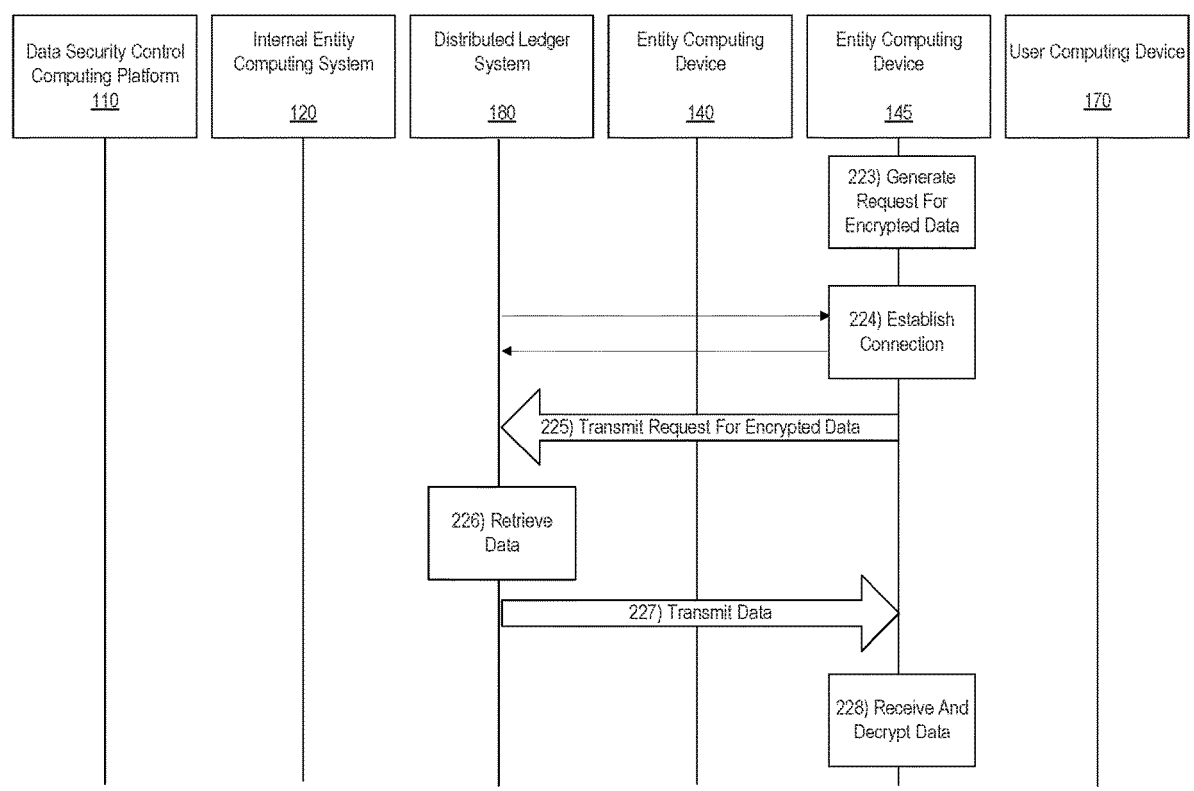

With reference to FIG. 2E, at step 223, entity computing device 145 may generate a request for encrypted data. For instance, in continuing the example of the transaction being a purchase of a vehicle, entity computing device 140 may be associated with an insurance company that may provide insurance coverage for the vehicle and entity computing device 145 may be associated with a financial institution that may transfer funds to the seller. Accordingly, entity computing device 145 may generate a request for encrypted data associated with the transaction. The encrypted data may be associated with the payment category data (e.g., amount, account numbers, and the like).

At step 224, entity computing device 145 may connect to distributed ledger system 180. For instance, a fifth wireless connection may be established between entity computing device 145 and distributed ledger system 180. Upon establishing the fifth wireless connection, a communication session may be initiated between entity computing device 145 and distributed ledger system 180.

At step 225, entity computing device 145 may transmit or send the request for encrypted data to the distributed ledger system 180. For instance, the request may be transmitted or sent during the communication session initiated upon establishing the fifth wireless connection.

At step 226, distributed ledger system 180 may receive the request for encrypted data and may retrieve the requested data. At step 227, distributed ledger system 180 may transmit or send the encrypted data to the entity computing device 145.

At step 228, entity computing device 145 may receive the encrypted data and may decrypt the data. For instance, entity computing device 145 may decrypt the data using a key received with a notification sent by the data security control computing platform 110.

Figure 2F:
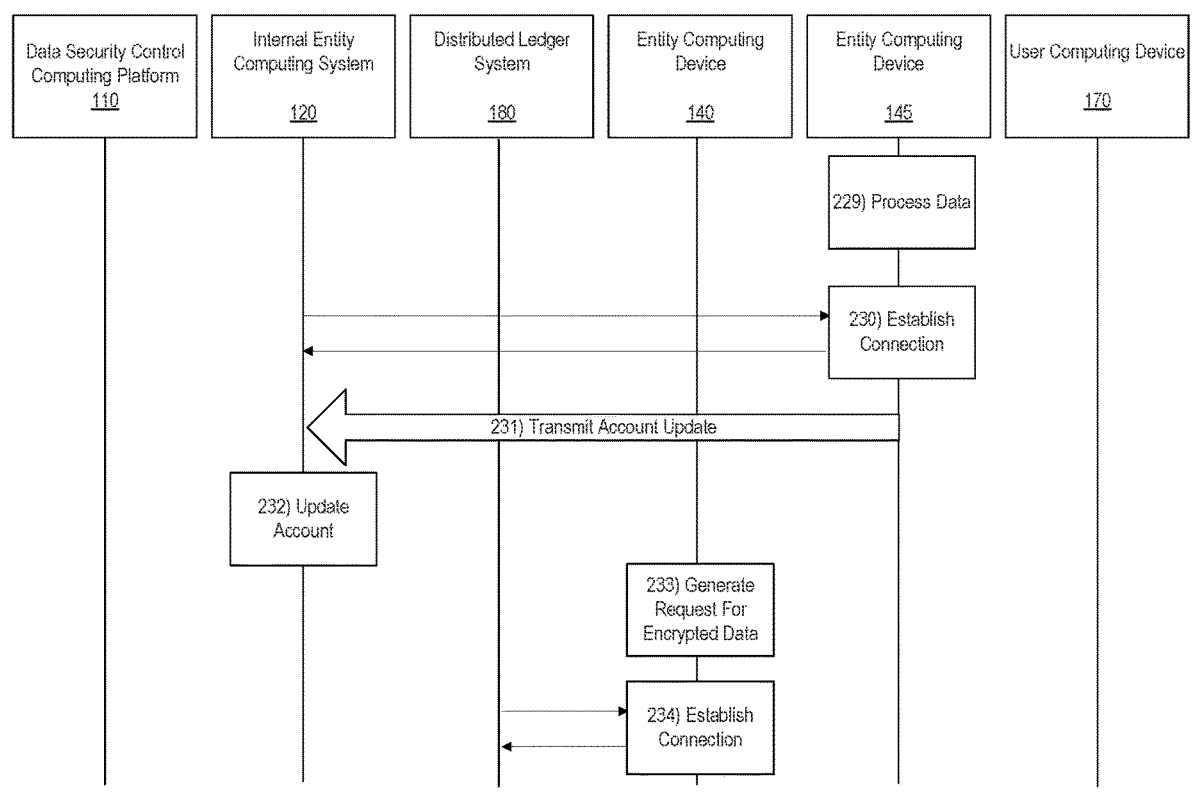

With reference to FIG. 2F, at step 229, entity computing device 145 may process the encrypted data. For instance, entity computing device 145 may process the decrypted data to identify source and destination accounts for payment, an amount of the transaction, and the like.

At step 230, entity computing device 145 may connect to internal entity computing system 120. For instance, a sixth wireless connection may be established between entity computing device 145 and internal entity computing system 120. Upon establishing the sixth wireless connection, a communication session may be initiated between entity computing device 145 and internal entity computing system 120.

At step 231, entity computing device 145 may generate an instruction or command to update one or more accounts associated with the transaction. For instance, entity computing device 145 may generate an instruction or command to debit the amount of the transaction from the buyer's account and deposit it in the seller's account. Entity computing device 145 may transmit the instruction or command to update the one or more accounts to internal entity computing system 120. For instance, entity computing device 145 may send the command update the account to a financial institution system (e.g., internal entity computing system 120) during the communication session initiated upon establishing the sixth wireless connection.

At step 232, internal entity computing system 120 may receive the instruction or command and may execute the instruction or command, causing one or more account updates and/or transfer of funds from one account to another.

At step 233, entity computing device 140 may generate a request for encrypted data. For instance, if entity computing device 140 is associated with the insurance provider that will insure the vehicle, entity computing device 140 may generate a request for product detail category data.

At step 234, entity computing device 140 may connect to distributed ledger system 180. For instance, a seventh wireless connection may be established between entity computing device 140 and distributed ledger system 180. Upon establishing the seventh wireless connection, a communication session may be initiated between entity computing device 140 and distributed ledger system 180.

Figure 2G:
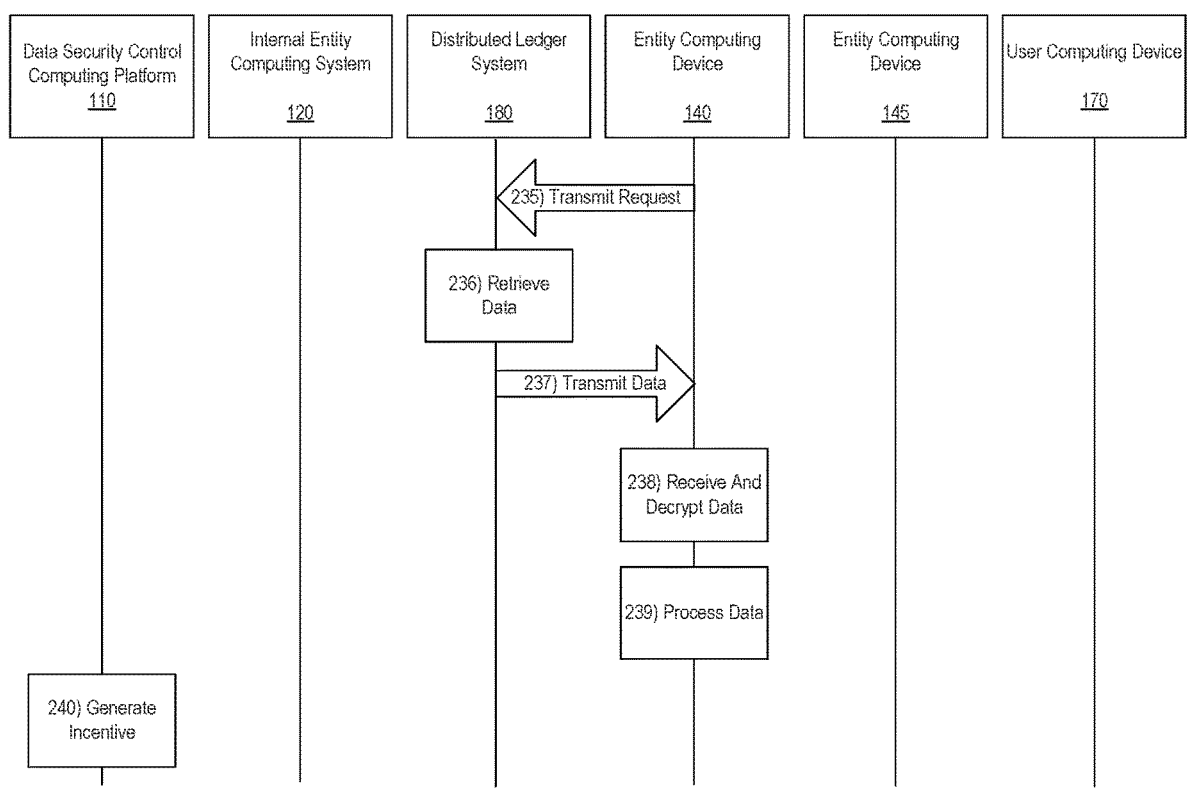

With reference to FIG. 2G, at step 235, entity computing device 140 may transmit or send the request for encrypted data to the distributed ledger system 180. For instance, the request may be transmitted or sent during the communication session initiated upon establishing the seventh wireless connection.

At step 236, distributed ledger system 180 may receive the request for encrypted data and may retrieve the requested data. At step 237, distributed ledger system 180 may transmit or send the encrypted data to the entity computing device 140.

At step 238, entity computing device 140 may receive the encrypted data and may decrypt the data. For instance, entity computing device 140 may decrypt the data using a key received with a notification sent by the data security control computing platform 110.

At step 239, entity computing device 140 may process the decrypted data. For instance, in the example in which entity computing device 140 is associated with an insurer of the vehicle, entity computing device 140 may generate a policy associated with the vehicle based on the decrypted data, may transmit one or more documents to the buyer, and the like.

At step 240, data security control computing platform 110 may generate an incentive for a user. For instance, data security control computing platform 110 may, based on user data (e.g., historical transaction data, current transaction data, user privacy and data access preferences, or the like), generate an incentive to offer to the user. The incentive may include rewards, discounts at vendors, or the like. In some examples, the reward or incentive may be redeemed at a vendor that is part of a marketplace associated with the enterprise organization (e.g., a registered vendor). Additionally or alternatively, the incentive may be redeemed at a vendor who is not associated with the marketplace and acceptance of the incentive by the vendor may cause the vendor to be registered with the marketplace.

Figure 2H:
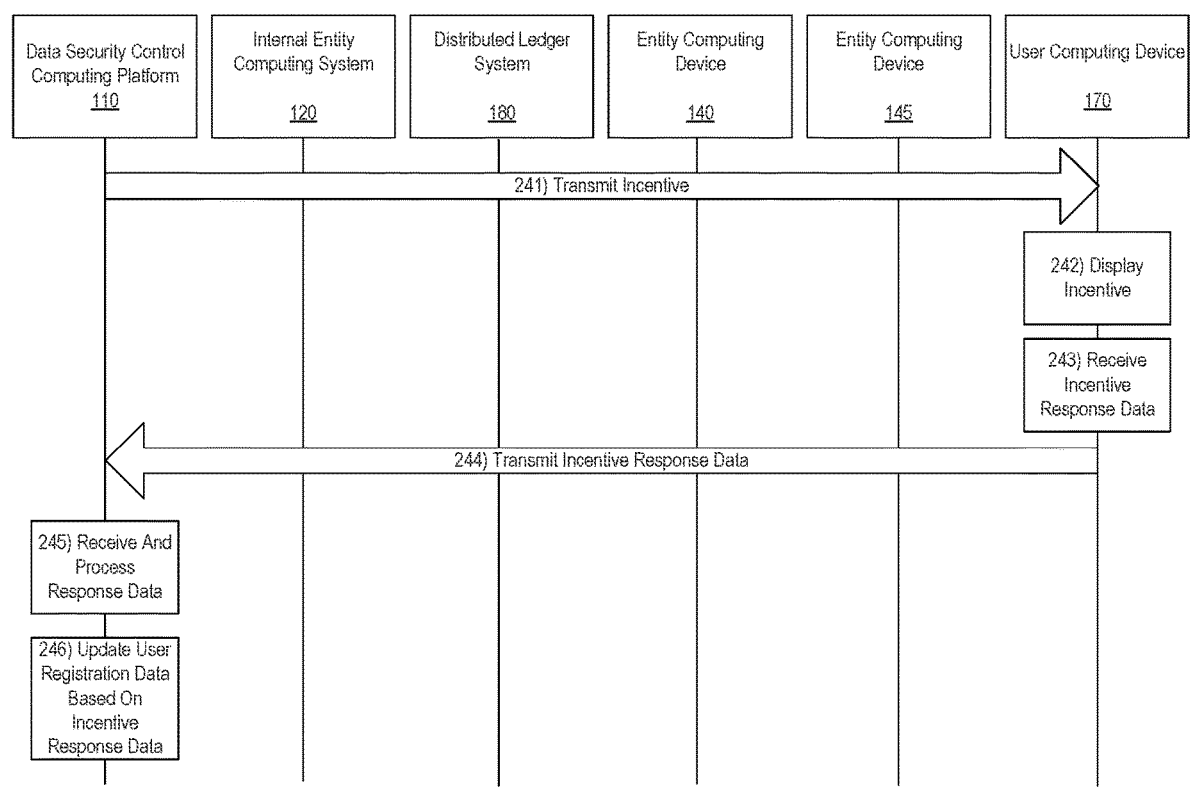

With reference to FIG. 2H, at step 241, data security control computing platform 110 may transmit or send the generated incentive to user computing device 170. In some examples, transmitting or sending the incentive may cause the incentive to be displayed on a display of the user computing device 170.

At step 242, user computing device 170 may display the incentive. In some examples, displaying the incentive may include displaying a request for incentive response data accepting or rejecting the offered incentive. For instance, FIG. 4 illustrates one example user interface 400 that may be displayed. The interface 400 includes identification of the offered incentive and the requested modification of user privacy or data access preferences, as well as selectable options to accept or reject the incentive.

With further reference to FIG. 2H, at step 243, user computing device 170 may receive incentive response data. For instance, the user may provide, via the user interface displayed on the user computing device 170, an indication of acceptance or rejection of the offered incentive. This user input may be used to generated incentive response data.

At step 244, the user computing device 170 may transmit or send the incentive response data to the data security control computing platform 110.

At step 245, data security control computing platform 110 may receive the incentive response data and may process the incentive response data (e.g., identify acceptance or rejection, identify data for updating, and the like).

At step 246, data security control computing platform 110 may update user registration or profile data (e.g., modify one or more databases) to include the incentive response data, update any user privacy or data access preferences based on the response data, and the like. For instance, if the user accepts the incentive, the user's privacy and data access preferences may be modified to reflect the additional data being shared by the user based on acceptance of the incentive. In some examples, the user's reward, credit, discount, or the like, may be stored as a token by data security control computing platform 110 that may be redeemed by the user as desired.

In some examples, if the user rejects the incentive, the rejection may be stored and further incentives offered to the user may provide different incentives based on the rejection.

Figure 3:
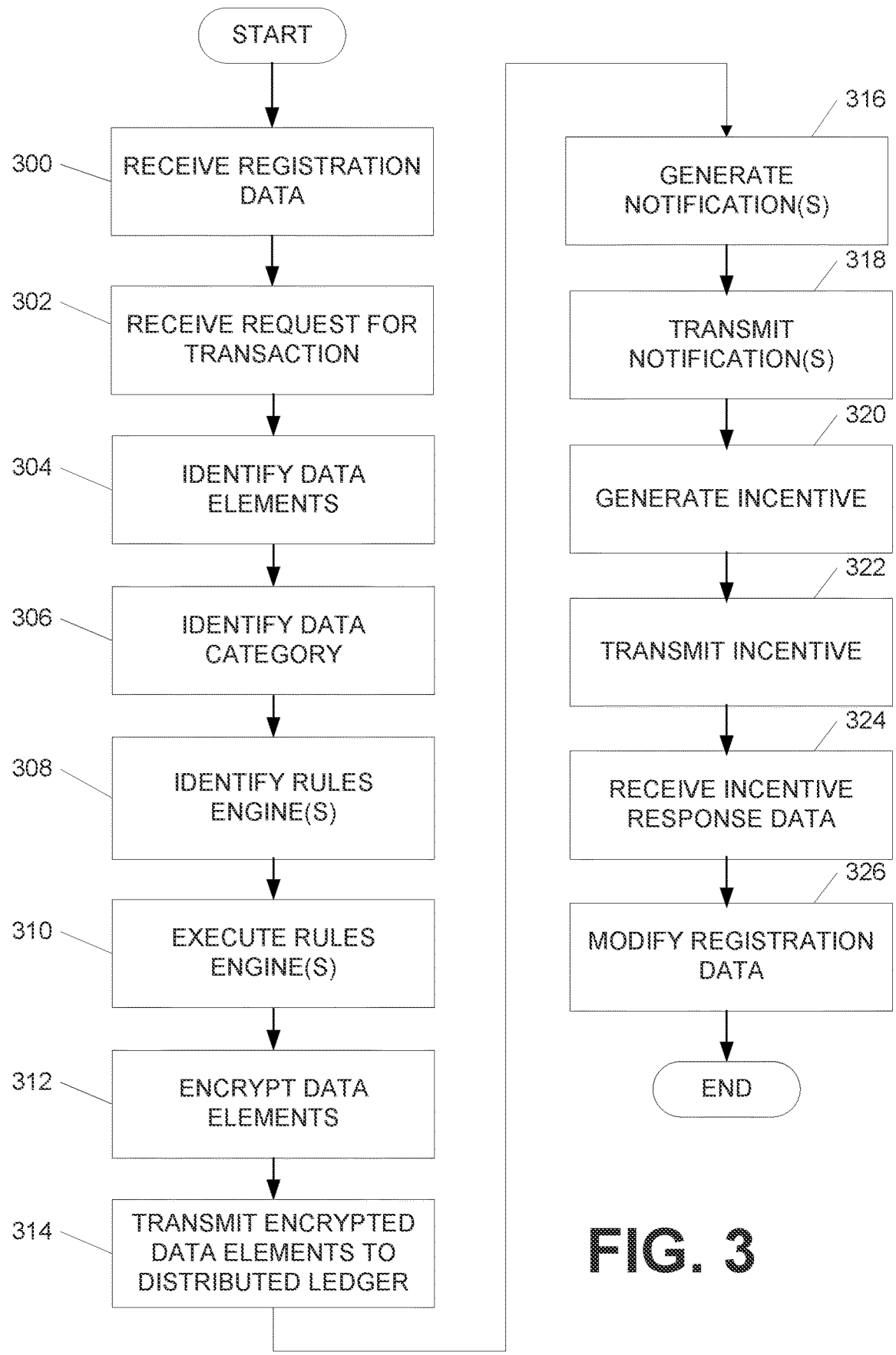
FIG. 3 illustrates an illustrative method for implementing data security control functions according to one or more aspects described herein.

FIG. 3 is a flow chart illustrating one example method of implementing data security control functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, registration data may be received from a user. For instance, a user may request, via user computing device 170, registration with the data security control computing platform 110. The registration data may include user profile data such as user identifier, device identifier for one or more devices associated with the user, account information for the user, and the like, as well as user privacy and data access preferences. For instance, the user privacy and data access preferences may indicate types of data, amounts of data, or the like, that the user is willing to share (e.g., from the one or more devices, from transactions being processed, or the like).

At step 302, a request for a transaction may be received. In some examples, the request for a transaction may include a purchase of goods or services, payment of an invoice, sharing of data, or the like. In some examples, the request for the transaction may be received from a source node (e.g., user computing device 170) and may identify one or more target nodes (e.g., devices to which data is being transmitted), accounts to be used in the transaction (e.g., source and/or target account(s)), information about goods or services being purchased, or the like. In some examples, the request for the transaction may be received via a Web3 system and the data security control computing platform 110 may intercept the request and apply one or more control features to comply with regulatory requirements, ensure user privacy preferences are met, and the like.

At step 304, a plurality of data elements within the request for transaction may be identified. For instance, if the request for transaction is an invoice to be paid, data elements such as payer, payee, source account, target account, amount of payment, address of payer, address of payee, and the like, may be identified. The example data elements identified are merely some examples and additional data elements, or different data elements based on the transaction type, may be identified without departing from the invention.

At step 306, a data category for each data element may be identified. For instance, the source account, target account, and amount may be identified as "payment" category data, while the payer, payee, address of the payer and address of the payee may be identified as "personal" category data.

At step 308, one or more rules engines to execute may be identified. For instance, based on the type of transaction, location of the source node, location of the target node, or the like, one or more rules engines may be identified. In some examples, rules engines may execute rules associated with regulatory requirements in different countries or regions. Additionally or alternatively, one or more rules engines may store rules associated with regulatory requirements for particular types of transactions or transactions over a particular amount. Still further, one or more rules engines may execute user privacy and data access preferences (e.g., provided at registration or in the user profile).

At step 310, the one or more identified rules engine(s) may be executed. For instance, rules associated with the one or more rules engine(s) may be applied to the categorized data elements to generate a plurality for secure data elements. In some examples, the plurality of secure data elements may correspond to the plurality of data elements in that each data element of the plurality of data elements may have one or more rules applied to generate the secure data element corresponding to a respective data element. In some examples, executing the rules engine(s) may include applying user privacy and data access preferences to control distribution of user data. For instance, data may be anonymized or masked based on one or more rules in a rules engine and based on user preferences. In continuing the above example of an invoice being paid, the payer address and payee address might be data that the user has requested to keep as private. This data might not be necessary to the financial institution to facilitate payment. Accordingly, the address data may be masked via application of one or more rules to generate secure data elements that do not provide access to the address data. Masking of address data is merely one example and additional data may be masked or anonymized without departing from the invention.

At step 312, the secure data elements may be encrypted. In some examples, the secure data elements may be encrypted with a public key of a public-private key pair. In some arrangements, each data element may be encrypted discretely. Additionally or alternatively, groups of data elements (e.g., based on data category, based on target relevance, or the like) may be encrypted together.

At step 314, the encrypted secure data elements may be transmitted or sent to a distributed ledger system. In some examples, sending the encrypted secure data elements to the distributed ledger system may cause the distributed ledger to store the encrypted secure data elements in a distributed ledger (e.g., one or more blocks may be added to a blockchain).

At step 316, one or more notifications may be generated. For instance, one or more notifications indicating that the encrypted secure data elements have been transmitted to the distributed ledger system may be generated. In some examples, the notifications may include a public key of the public-private key pair that may be used by a designated target node to retrieve and decrypt the data from the distributed ledger system.

At step 318, the generated one or more notifications may be transmitted to one or more target nodes. In some examples, notifications may be transmitted to multiple target nodes. For instance, if multiple entities are access the data, a notification may be generated for each entity and transmitted to the respective entity. For instance, a first notification indicating that a first portion of the plurality of secure data elements has been transmitted to the distributed ledger system may be transmitted to a first target node. In some examples, the first target node may include the public key to decrypt the first portion of the plurality of secure data elements.

Further, a second notification indicating that a second portion of the plurality of secure data elements, different from the first plurality of secure data elements, has been transmitted to the distributed ledger system may be transmitted to a second target node. In some examples, the second target node may include the public key to decrypt the second portion of the plurality of secure data elements.

At step 320, based on user registration or profile data, an incentive to encourage a user to modify the user's data access preferences may be generated. In some examples, the incentive may include a reward or discount that may be redeemed at one or more vendors. In exchange for the reward or discount, the incentive may request that a user share additional amounts of data, types of data, or the like.

At step 322, the generated incentive may be transmitted to the user computing device (e.g., user computing device 170 which may be the source node). In some examples, transmitting the generated incentive may cause the generated incentive to be displayed on a display of the user computing device 170.

At step 324, incentive response data may be received from the user computing device. For instance, the user may select, via one or more selectable options displayed on the incentive, an option to accept or reject the offered incentive. The user selection may be used to generate incentive response data.

At step 326, based on the received incentive response data, user registration or profile data may be modified. For instance, if the incentive is accepted, user data access preferences may be modified to permit the user-defined changes to data access and a token representing the reward or discount may be generated and stored in the user registration data or profile data until redeemed by the user.

As discussed herein, aspects described relate to a framework that may be used, in some examples, with Web3 systems, to provide data security, privacy and controls. In addition, aspects described herein may provide incentives for users to share additional types of data, amounts of data, or the like. The arrangements described herein work with distributed ledger systems and technology (e.g., blockchain, or the like) that are publicly auditable and/or verifiable. Accordingly, maintaining data privacy may be an important consideration for users.

Further, arrangements described herein may enable compliance with data protection laws or regulations, country specific laws and regulations, as well as other regulatory requirements that may exist. For instance, by using one or more rules engines to apply rules to different types of data, data associated with different transactions, or the like, compliance with regulatory requirements may be provided.

Further, the one or more rules engines may be executed (e.g., rules in one or more rules engines may be applied) in parallel to efficiently process the data. In some examples, the one or more rules engines may be continuously updated.

In some examples in which transactions are taking place between countries, states or regions, the rules engines described may include rules associated with all jurisdictions associated with the transaction. Accordingly, upon determining that a source node is in a first jurisdiction and a target node is in a different jurisdiction, rules engines associated with all jurisdictions may be identified and executing to apply all rules to comply with regulations in all jurisdictions.

Further, while users may control access to data, in some examples, users may wish to share data (e.g., for gaining insights into patterns of use, to provide aggregated data for evaluation, and the like). Accordingly, users may designate one or more devices (e.g., wearable devices, mobile devices, or the like) for which data may be pushed to the distributed ledger system for use. In some examples, a rules engine may apply one or more anonymizing or masking rules, and/or may aggregate data within, for example, a household, a neighborhood, or the like, to maintain anonymity of particular users, while providing the aggregated data for evaluations. For instance, data associated with user patterns or biometric data collected by a wearable device may be first anonymized or masked (e.g., personal identifying data may be masked or removed, or the like based on rules in a rules engine) before being aggregated and/or transmitted to the distributed ledger system for sharing.

As discussed herein, data may be encrypted (e.g., using a public-private key pair) before being transmitted to the distributed ledger system. Accordingly, in some examples, only a designated target node may be able to decrypt the data. Further, by identifying different types of data, the arrangements described herein share only data that is necessary for target nodes to receive, rather than conventional systems where all data is provided.

For instance, if a user is obtaining a loan, the user may prefer to provide or share information about a property address or type of property but maintain as private the details of the loan. Accordingly, in some examples, while all data may be shared, the user may determine visibility of different types of data to different targets or destinations.

As discussed, the framework described herein may sit atop a Web3 or blockchain system as a layer that may intercept data prior to being provided to the Web3 or blockchain system. The framework may provide an additional layer of security, governance and privacy control.

In some arrangements, aspects described herein may be used in conjunction with a decentralized autonomous organization (DAO). For instance, if a user is part of a DAO, the user may share more data or more types of data when transmitted or shared within the DAO. However, upon determining that data is being transmitted outside of the DAO, the framework arrangements described herein may be initiated to evaluate the data types, discretize the data, apply rules engine(s), encrypt the data, and the like.

Further, as discussed herein, the framework may generate one or more incentives for a user to share additional data, additional types of data, and the like. For instance, in exchange for sharing additional data, the system may provide the user with a reward, discount, or the like. These arrangements may allow a user to continue to control access to their data, while gaining an incentive to share data.

In arrangements in which the user is offered an incentive, the user may still control what data is shared or an amount of data that is shared. For instance, the user, who previously might not have shared data from one or more IoT devices, may be willing to share that data but only if it is anonymized and aggregated such that data associated with any particular user cannot be identified. The user may provide these parameters that may then be used to update one or more rules engines.

Further, the user may choose to accept, reject or request modification of any particular incentive provided. For instance, an additional 100 rewards points may be offered but the user may prefer a 10% discount at a local vendor. Accordingly, the user may request modification of the incentive to something of more interest to the user.

As discussed herein, the rewards, discounts, or the like, may be redeemed at one or more vendors, service providers, or the like. In some examples, the enterprise organization may provide a marketplace of vendors who are registered with the system and at which the user may redeem an incentive. In some examples, the user may consent to share his or her data with a particular vendor in exchange for the incentive (e.g., I will share my anonymized data with my local coffee shop for a 10% discount).

The reward, discount, or the like, may be a token stored in the user registration data or profile data. In some examples, individual tokens may be redeemed for a predetermined number of tokens may be redeemed. Tokens, rewards, discounts, and the like, may be redeemed at registered vendors or, in some examples, a unregistered vendors who are not part of the marketplace. In those examples, acceptance of the token may cause the vendor to be registered with the marketplace.

Figure 5:
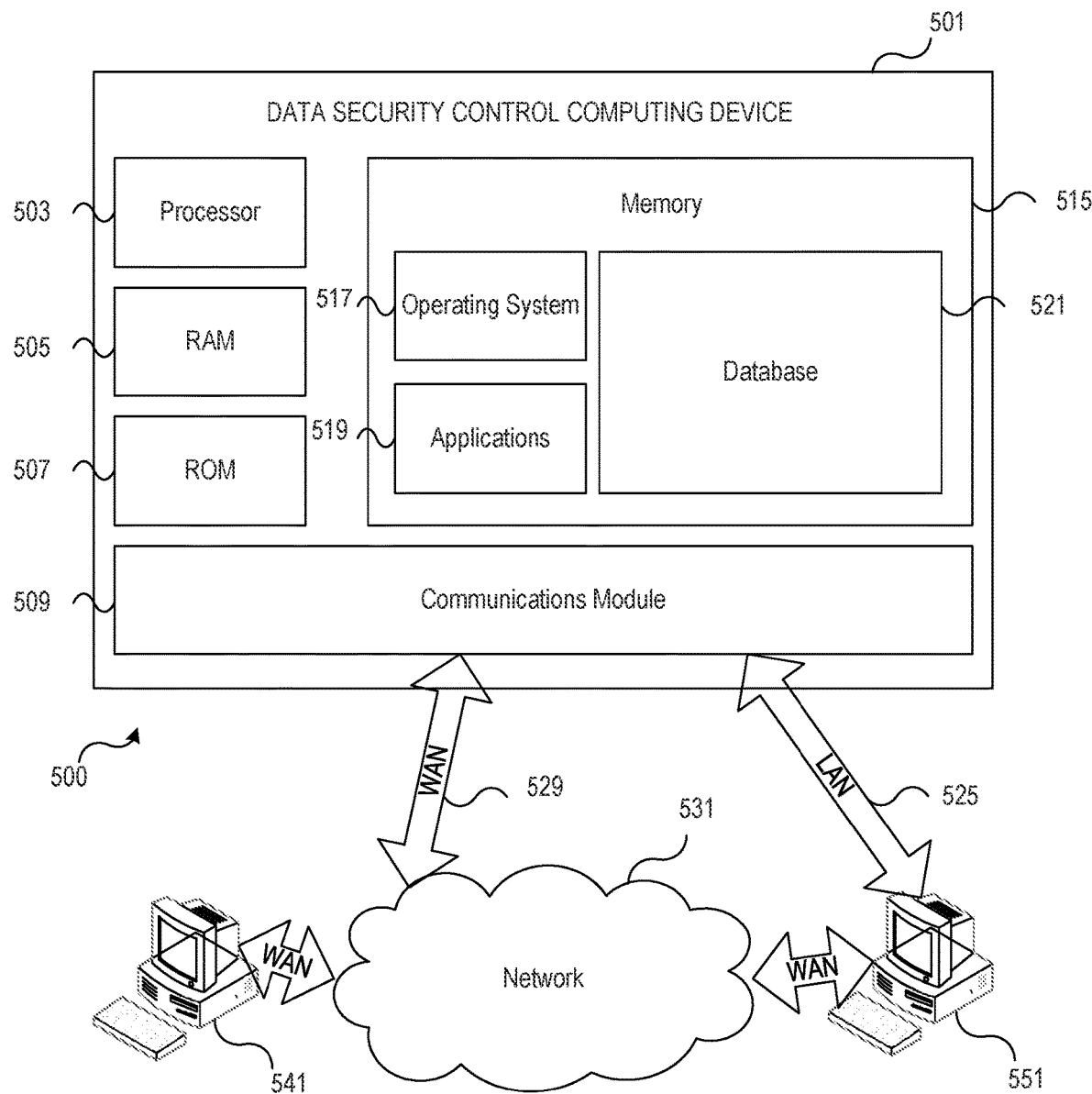
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include data security control computing device 501 having processor 503 for controlling overall operation of data security control computing device 501 and its associated components, including Random Access Memory (RAM) 505, Read-Only Memory (ROM) 507, communications module 509, and memory 515. Data security control computing device 501 may include a variety of computer readable media. Computer readable media may be any available media that may be accessed by data security control computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by data security control computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on data security control computing device 501. Such a processor may execute computer-executable instructions stored on a computer-readable medium.

Software may be stored within memory 515 and/or storage to provide instructions to processor 503 for enabling data security control computing device 501 to perform various functions as discussed herein. For example, memory 515 may store software used by data security control computing device 501, such as operating system 517, application programs 519, and associated database 521. Also, some or all of the computer executable instructions for data security control computing device 501 may be embodied in hardware or firmware. Although not shown, RAM 505 may include one or more applications representing the application data stored in RAM 505 while data security control computing device 501 is on and corresponding software applications (e.g., software tasks) are running on data security control computing device 501.

Communications module 509 may include a microphone, keypad, touch screen, and/or stylus through which a user of data security control computing device 501 may provide input, and may also include one or more of a speaker for providing audio output and a video display device for providing textual, audiovisual and/or graphical output. Computing system environment 500 may also include optical scanners (not shown).

Data security control computing device 501 may operate in a networked environment supporting connections to one or more remote computing devices, such as computing device 541 and 551. Computing devices 541 and 551 may be personal computing devices or servers that include any or all of the elements described above relative to data security control computing device 501.

The network connections depicted in FIG. 5 may include Local Area Network (LAN) 525 and Wide Area Network (WAN) 529, as well as other networks. When used in a LAN networking environment, data security control computing device 501 may be connected to LAN 525 through a network interface or adapter in communications module 509. When used in a WAN networking environment, data security control computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one FIG. 10 may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive, from a source node, a request for a transaction;
   analyze the request for a transaction to identify a plurality of data elements within the request for the transaction;
   identify, for each data element of the plurality of data elements, a category of data associated with a respective data element;
   identify, based on the identified categories of data associated with the respective data elements, one or more rules engines to execute;
   execute the identified one or more rules engines to generate a plurality of secure data elements corresponding to the plurality of data elements;
   encrypt each secure data element of the plurality of secure data elements;
   transmit, to a distributed ledger system, each encrypted secure data element of the plurality of secure data elements, wherein transmitting each secure data element to the distributed ledger system causes a distributed ledger to store each encrypted secure data element;
   generate one or more notifications indicating that each encrypted secure data element has been transmitted to the distributed ledger system; and
   transmit, to a plurality of target nodes, the generated one or more notifications, wherein transmitting the generated one or more notifications causes the one or more notifications to be displayed on a respective target node.

2. The computing platform of claim 1, wherein a first notification is transmitted to a first target node and a second notification is transmitted to a second target node.

3. The computing platform of claim 2, wherein the first notification indicates that a first portion of the plurality of secure data elements has been transmitted to the distributed ledger system and may be retrieved by the first target node.

4. The computing platform of claim 3, wherein the first notification includes a key of a key pair to decrypt the encrypted secure data elements in the first portion of the plurality of secure data elements.

5. The computing platform of claim 4, wherein the encrypted secure data elements in the first portion of the plurality of secure data elements are associated with a first category of data.

6. The computing platform of claim 5, wherein the second notification indicates that a second portion of the plurality of secure data elements, different from the first portion, has been transmitted to the distributed ledger system and may be retrieved by the second target node.

7. The computing platform of claim 6, wherein the second notification includes a key of a key pair to decrypt the encrypted secure data elements in the second portion of the plurality of secure data elements.

8. The computing platform of claim 7, wherein the encrypted secure data elements in the second portion of the plurality of secure data elements are associated with a second category of data, different from the first category of data.

9. The computing platform of claim 1, further including instructions that, when executed, cause the computing platform to:
   prior to receiving, from the source node, the request for the transaction, receive registration data of a user associated with the source node, wherein the registration data includes user privacy and data access preferences;
   generate an incentive for the user associated with the source node to modify the user privacy and data access preferences; and
   transmit, to the source node, the generated incentive, wherein transmitting, to the source node, the generated incentive, causes the generated incentive to display on a display of the source node.

10. The computing platform of claim 9, further including instructions that, when executed cause the computing platform to:
    receive, from the source node, incentive response data; and
    modify, based on the incentive response data, the registration data.

11. A method, comprising:
    receiving, by a computing platform, the computing platform having at least one processor, and memory and from a source node, a request for a transaction;
    analyzing, by the at least one processor, the request for a transaction to identify a plurality of data elements within the request for the transaction;
    identifying, by the at least one processor and for each data element of the plurality of data elements, a category of data associated with a respective data element;
    identifying, by the at least one processor and based on the identified categories of data associated with the respective data elements, one or more rules engines to execute;
    executing, by the at least one processor, the identified one or more rules engines to generate a plurality of secure data elements corresponding to the plurality of data elements;
    encrypting, by the at least one processor, each secure data element of the plurality of secure data elements;
    transmitting, by the at least one processor and to a distributed ledger system, each encrypted secure data element of the plurality of secure data elements, wherein transmitting each encrypted secure data element to the distributed ledger system causes a distributed ledger to store each encrypted secure data element;
    generating, by the at least one processor, one or more notifications indicating that each encrypted secure data element has been transmitted to the distributed ledger system; and
    transmitting, by the at least one processor and to a plurality of target nodes, the generated one or more notifications, wherein transmitting the generated one or more notifications causes the one or more notifications to be displayed on a respective target node.

12. The method of claim 11, wherein a first notification is transmitted to a first target node and a second notification is transmitted to a second target node.

13. The method of claim 12, wherein the first notification indicates that a first portion of the plurality of secure data elements has been transmitted to the distributed ledger system and may be retrieved by the first target node.

14. The method of claim 13, wherein the first notification includes a key of a key pair to decrypt the encrypted secure data elements in the first portion of the plurality of secure data elements.

15. The method of claim 14, wherein the encrypted secure data elements in the first portion of the plurality of secure data elements are associated with a first category of data.

16. The method of claim 15, wherein the second notification indicates that a second portion of the plurality of secure data elements, different from the first portion, has been transmitted to the distributed ledger system and may be retrieved by the second target node.

17. The method of claim 16, wherein the second notification includes a key of a key pair to decrypt the encrypted secure data elements in the second portion of the plurality of secure data elements.

18. The method of claim 17, wherein the encrypted secure data elements in the second portion of the plurality of secure data elements are associated with a second category of data, different from the first category of data.

19. The method of claim 11, further including:
    prior to receiving, from the source node, the request for the transaction, receiving, by the at least one processor, registration data of a user associated with the source node, wherein the registration data includes user privacy and data access preferences;
    generating, by the at least one processor, an incentive for the user associated with the source node to modify the user privacy and data access preferences;
    transmitting, by the at least one processor and to the source node, the generated incentive, wherein transmitting, to the source node, the generated incentive, causes the generated incentive to display on a display of the source node;
    receiving, by the at least one processor and from the source node, incentive response data; and
    modifying, by the at least one processor and based on the incentive response data, the registration data.

20. One or more non-transitory computer-readable media storing instructions that, when executed by a computing platform comprising at least one processor, memory, and a communication interface, cause the computing platform to:
    receive, from a source node, a request for a transaction;
    analyze the request for a transaction to identify a plurality of data elements within the request for the transaction;
    identify, for each data element of the plurality of data elements, a category of data associated with a respective data element;
    identify, based on the identified categories of data associated with the respective data elements, one or more rules engines to execute;

execute the identified one or more rules engines to generate a plurality of secure data elements corresponding to the plurality of data elements;

encrypt each secure data element of the plurality of secure data elements;

transmit, to a distributed ledger system, each encrypted secure data element of the plurality of secure data elements, wherein transmitting each encrypted secure data element to the distributed ledger system causes a distributed ledger to store each encrypted secure data element;

generate one or more notifications indicating that each encrypted secure data element has been transmitted to the distributed ledger system; and transmit, to a plurality of target nodes, the generated one or more notifications, wherein transmitting the generated one or more notifications causes the one or more notifications to be displayed on a respective target node.

\* \* \* \* \*